United States Patent
Leister (10) Patent No.: US 8,384,973 B2
(45) Date of Patent: Feb. 26, 2013

(54) METHOD AND DEVICE FOR RECONSTRUCTING A THREE-DIMENSIONAL SCENE WITH CORRECTED VISIBILITY

(75) Inventor: Norbert Leister, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 622 days.

(21) Appl. No.: 12/531,328

(22) PCT Filed: Mar. 12, 2008

(86) PCT No.: PCT/EP2008/052903
§ 371 (c)(1),
(2), (4) Date: Jan. 7, 2010

(87) PCT Pub. No.: WO2008/110565
PCT Pub. Date: Sep. 18, 2008

(65) Prior Publication Data
US 2010/0118360 A1 May 13, 2010

(30) Foreign Application Priority Data
Mar. 15, 2007 (DE) .......................... 10 2007 013 431

(51) Int. Cl.
*G03H 1/08* (2006.01)
*G03H 1/26* (2006.01)
*G03H 1/22* (2006.01)
*G02B 5/32* (2006.01)
(52) U.S. Cl. ................... 359/9; 359/21; 359/22; 359/32
(58) Field of Classification Search ....................... 359/9
See application file for complete search history.

(56) References Cited

U.S. PATENT DOCUMENTS
5,400,155 A 3/1995 Ueda et al.
2003/0156305 A1 8/2003 Kitamura

FOREIGN PATENT DOCUMENTS
WO WO 2006/066919 6/2006

OTHER PUBLICATIONS

Written Opinion and International Search Report, dated Jul. 8, 2009, issued in priority International Application No. PCT/EP2008/052903 (in German).
Unterkoffler, J., "Occlusion processing and smooth surface shading for fully computer synthetic holography," Proceedings of the SPIE—the International Society for Optical Engineering, SPIE, pp. 19-30 (Feb. 1997) XP007903740.
Matsushima, K, "Exact hidden-surface removal in digitally synthetic full-parallax holograms," SPIE, pp. 25-32 (Jan. 2005) XP040200952.

*Primary Examiner* — Jade R Chwasz
(74) *Attorney, Agent, or Firm* — Saul Ewing LLP (57) ABSTRACT

A method is disclosed for reconstructing a 3D scene made of object points in a holographic display, wherein the reconstruction is visible from a visibility region. Visibility and/or covering of parts of the 3D scene corresponding to the real parameters is realized, with the reconstruction, for a viewer from every place of the visibility region. Processor means generate a spatial point matrix for defining the positions of individual object points, which are assigned predetermined intensity and phase values. Within the visibility region, a complex-value wave front for each single object point is calculated. The intensity values of the object points are multiplied with the associated visibility function, to determine a common modified wave front of the object points, transformed into the plane of a light modulator to calculate modified control values for the object points.

11 Claims, 6 Drawing Sheets

METHOD AND DEVICE FOR RECONSTRUCTING A THREE-DIMENSIONAL SCENE WITH CORRECTED VISIBILITY

CROSS REFERENCE TO RELATED APPLICATIONS

This application claims the priority of PCT/EP2008/052903, filed on Mar. 12, 2008, which claims priority to German Application No. 10 2007 013 431.4, filed Mar. 15, 2007, the entire contents of which are hereby incorporated in total by reference.

BACKGROUND OF THE INVENTION

The present invention relates to a method for presenting an observer a holographically reconstructed three-dimensional scene (3D scene), and to a holographic display device in which this method is implemented.

The field of application of the invention includes holographic display devices in sectors where a very detailed and realistic representation of 3D scenes is essential. This can for example be the medical, geological or military industry, in order to plan operations, drill-holes and other activities precisely and thus to reduce costs considerably and/or to minimise risks. In addition, such display devices may be used in the private sector, e.g. for games.

Holographic display devices which implement this invention always also exhibit a visibility region which lies in the transformation plane of the encoded computer-generated hologram (CGH) within a periodicity interval of this transformation. The reconstruction of the 3D scene can be observed from an eye position in the visibility region, where the visibility region is larger than an eye pupil.

Wherever 3D scenes are mentioned in this document, this may relate to either stationary or moving 3D scenes, always including a single three-dimensional object.

Holography allows a 3D scene to be recorded and optically represented using wave-optical methods. The 3D scene is encoded in the form of a CGH on a light modulator, which serves as a carrier medium and which comprises discrete, spatially controllable light modulator means. Due to the illumination with light waves which are capable of generating interference, each point of the encoded 3D scene forms a point of origin of light waves which interfere with each other, and which, as a resultant light wave front, spatially reconstruct the 3D scene as if it was generated by light propagating from a real object in space. The holographic reconstruction of the 3D scene is achieved in a direct-view display with the help of an optical reconstruction system and by illuminating a carrier medium with sufficiently coherent light.

When encoding a hologram, the information can be encoded through complex-valued wave fronts of the 3D scene such that the observer sees different perspectives or views of this scene when he moves relative to the reconstruction of the 3D scene. Parts of the spatial scene may be visible in one view, but hidden and thus invisible in another view. This depends on the actual observer position from which the 3D scene is observed, and on whether parts of the 3D scene are situated in the background or in the foreground. These perceptions must be taken into consideration when computing the hologram of the 3D scene, in order to obtain a realistic reconstruction. Computation of those parts which are invisible can be omitted.

In natural scenes, individual parts of the 3D scene are perceived at a different brightness from different positions, due to the surface texture and the effects of the illumination of the 3D scene by a natural light source. For example, a reflection of incident sunlight is only visible in a mirror to an observer who looks into the mirror from a certain direction. More generally, object surfaces reflect light in an angle-selective manner or radiate light in an angle-selective manner. Such characteristics of a realistic representation of a 3D scene should also be represented by the reconstruction of a hologram.

Various patent applications filed by the applicant describe a holographic image representation method in which a small visibility region is sufficient for viewing the reconstruction. The visibility region can therein be as large or only a little larger than the size of an eye pupil. The reconstruction of the 3D scene is generated for a right observer eye and for a left observer eye. If the observer moves, the reconstruction of the 3D scene is tracked to his new position with the help of position detection and tracking means. If necessary, the hologram must be computed and encoded anew for the new position, if the new view differs significantly from the previous one.

The smaller the visibility region, the less the perspective view changes within the visibility region, because there is only a small margin of movement. In a visibility region which is exactly as large as the eye pupil, there is an almost stationary view of the 3D scene. It can then already be determined in a generally known manner in the input data for hologram computation, for example as rendered in a 3D graphics programme, which object points are visible and which are not in the visibility region. If the hologram needs to be recomputed due to the tracking to the observer eyes, the changed perspective is taken into account in that these input data are changed.

However, the visibility region is preferably a little larger than the eye pupil, i.e. it has e.g. twice the size of the eye pupil, for example in order to compensate inaccuracies of the position detection and tracking means. The eye pupil can move to positions within such a visibility region which require a different view of the 3D scene.

The hologram computation—as described in previous patent applications filed by the applicant—is always performed with the aim to evenly distribute the light intensity of the individual object points in the visibility region, so that the 3D scene is visible in a uniform quality within the visibility region. However, if the visibility region is larger than the eye pupil, this does not fully comply with the requirements specified above with a view to a realistic representation of the 3D scene.

Although the change of the perspective as such, i.e. the relative displacement of object points within planes which are situated at different distances to the observer, is already considered in a thus computed hologram, errors in the reconstruction may occur in this case if the observer moves outside the centre of the visibility region. These errors are due to the fact that natural variations in brightness, at which individual parts of a 3D scene are visible from different perspectives, are not considered in the reconstruction. As a special case of this, the fact must be taken into account during hologram computation that object points may become visible or invisible in sections of the visibility region due to changes in the perspective.

Other known methods for computing the visibility or invisibility of parts of an object for example combine object points so as to form geometrically shaped areas. Depending on the actual requirements, algorithmic computation methods are carried out with these areas with object precision or image precision.

It is the object of the present invention to generate the reconstruction of a 3D scene in a holographic display device with a visibility region which is larger than the eye pupil such that a realistic visibility and/or invisibility of parts of the reconstructed 3D scene is realised for an observer eye at any position within the visibility region. The visibility of the object points of the 3D scene shall be taken into consideration during hologram computation.

The object is solved according to claim 1 by a method for reconstructing a 3D scene,
where the 3D scene is separated into individual object points of which a computer-generated hologram (CGH) of the 3D scene is encoded on a light modulator (SLM) of a holographic display device,
where at least one light source illuminates the light modulator with sufficiently coherent light and at least one transformation lens transforms the light,
where a processor controls control signals for encoding and reconstructing, and
where the reconstruction of the 3D scene is visible from an observer plane within a visibility region,
characterised in that
the processor generates a spatial point matrix for defining the position of individual object points in horizontal, vertical and depth directions, and assigns the object points with predetermined intensity and phase values which approximate the 3D scene,
a complex-valued wave front is computed for each individual object point within the visibility region, and the intensity values of the object points are multiplied with a visibility function which is assigned to the individual object points and are then added so as to form an aggregated modified wave front of the object points,
the modified wave front is transformed into the plane of the light modulator in order to compute modified control values for the object points, and
control signals are generated in a control means, in order to encode the CGH in the light modulator with the modified control values and to transform it into the visibility region so as to reconstruct the 3D scene.

SUMMARY OF THE INVENTION

Another way of defining object points is to slice a 3D scene into section layers which are parallel to the plane of a light modulator first, and to generate the two-dimensional point matrix in each of these section layers.

In order to show or hide the object points, the visibility function is preferably continuously varied depending on continuous intensity variation of the object points of the 3D scene in adjacent section layers.

In a modification of the method according to claim 1, after completion of the first process step, showing or hiding of object points can also be achieved in that a computing means computes directly on the light modulator a sub-hologram for each object point of the 3D scene which is assigned with certain intensity and phase values according to the point matrix. Then, the visibility functions in the visibility region which are assigned to the object points are transformed by a transformation means into the plane of the light modulator and convolved with the sub-holograms. The thus computed, modified CGH is encoded on the light modulator and transformed into the visibility region in order to reconstruct the 3D scene.

Due to the dimensions of the visibility region, the convolving with the transform of the visibility function can be approximated by resizing the visibility function in relation to the size of the respective sub-hologram and by then multiplying the amplitude of the sub-hologram with the visibility function. This simplifies the method and saves computing power.

According to the present invention, the method is implemented in a holographic display device, where the 3D scene is separated into individual object points of which a computer-generated hologram (CGH) of the 3D scene is encoded on a light modulator, where a processor controls control signals for encoding and reconstructing, and where the reconstruction of the 3D scene can be viewed from a visibility region, said device being characterised in that it comprises the following means:
processor means for generating a spatial point matrix, in order
to define the position of individual object points in horizontal, vertical and depth directions, and
to assign the object points with predetermined intensity and phase values for approximating the 3D scene,
computing means for computing a complex-valued wave front for each individual object point within the visibility region, for multiplying the intensity values of the object points with an assigned visibility function, in order to form an aggregated modified wave front of the object points by adding the thus modified wave fronts of all object points, and for generating the visibility function for the object points,
transformation means for transforming the modified wave front into the plane of the light modulator, in order to compute modified control values for the object points, and
control means for generating control signals in the processor, in order to encode the CGH on the light modulator with the modified control values and to transform it into the visibility region so as to reconstruct the 3D scene.

In embodiments of the present invention, where the 3D scene is preferably sliced into section layers, the object points of a section layer lie in a point matrix which exhibits a certain spacing both in the horizontal and in the vertical directions, where said spacing may be the same or different in the two dimensions.

When computing the change in the intensity of object points, the spacing may preferably differ among adjacent section layers.

Further, it is preferable for the computation if each visible object point is encoded as a sub-hologram on the light modulator.

If a CGH is computed according to this method, an observer who moves within the visibility region will see a representation of the 3D scene which differs depending on the actual perspective.

BRIEF DESCRIPTION OF THE DRAWINGS

The inventive method for reconstructing a 3D scene in a holographic display device will be described in detail below in conjunction with the accompanying drawings, wherein.

DETAILED DESCRIPTION

It is known from the prior art to separate the 3D scene into section layers which are parallel to the plane of an SLM and to transform all of those section layers into a visibility region SB in the observer plane BE and to add their values there. Then, the 3D scene is computed in the hologram plane by way of another transformation of those aggregated values into the light modulator, and encoded as a CGH on the SLM.

In contrast, according to the inventive method, the 3D scene is separated into individual object points P; . . . ; Pn, and each individual object point Pn is discretely transformed into the visibility region SB. The transformation of an individual object point Pn initially generates in the visibility region SB a constant intensity and a phase gradient which depends on the position of the object point Pn in the respective section layer, or in the 3D scene. The entire distribution of values in the visibility region SB is found by way of adding the complex values of all individual object points P; . . . ; Pn.

Because of the limited aperture of the eye pupil and because of the wave characteristic of the light, a limited-diffraction resolution of the individual object points of the 3D scene is obtained. Consequently, if the hologram is computed based on individual object points, the observer sees in the reconstruction a confined Airy disk rather than an object point.

The method according to this invention will now be described with the help of object points P; P1; P2 representative of the 3D scene. At least one light source, not shown, illuminates the SLM in the FIGS. 1, 3, 4 and 6 with sufficiently coherent light. Further, at least one transformation lens, not shown, is disposed in the optical path in the FIGS. 1, 3, 4 and 6 in order to realise the transformations. Further, the arrangements shown in FIGS. 1, 3, 4 and 6 comprise a frustum-shaped reconstruction volume RV in which the reconstructed 3D scene is visible. The volume stretches from the visibility region SB with its edges to the corners of the display screen. Depending on the actual encoding on the SLM, it can continue beyond the screen. The reconstruction volume RV is only shown in FIG. 1.

Figure 1:
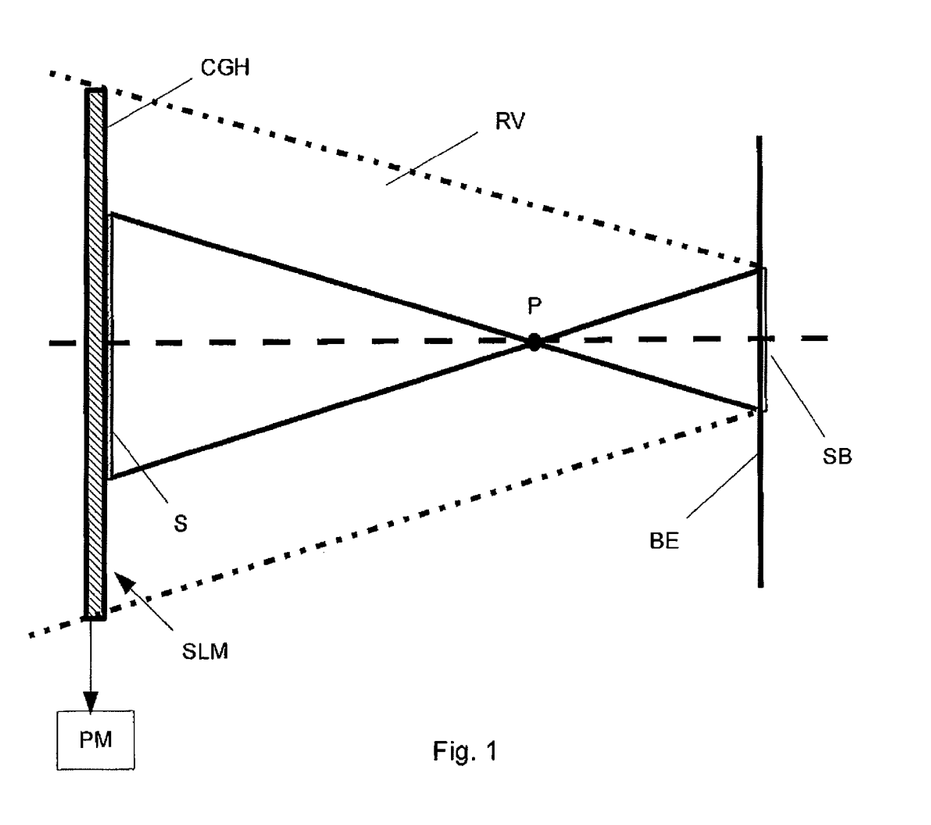
FIG. 1 is a top view showing an object point of an encoded sub-hologram, said object point being reconstructed between an SLM and a visibility region in an observer plane.

Referring to FIG. 1, at first an individual object point P of a 3D scene is considered which is situated in an arbitrary plane in the reconstruction volume RV.

The sub-hologram S of the object point P, or the CGH of the entire 3D scene are encoded on the SLM. The sub-hologram S of the object point P is computed such that the propagation of light from the object point P into the visibility region SB in the observer plane BE is computed with wave-optical methods by performing a transformation, e.g. a Fresnel transformation, from the plane of the object point P into the observer plane BE. If a transformation from the observer plane BE into the hologram plane is then carried out, a confined region is created there in a fixed position, said region including the information about the object point P in the form of a complex-valued wave front. The absolute value of the wave front outside of that region is almost zero. This confined region is also referred to as sub-hologram S. Alternatively, the sub-hologram S can also be computed directly, instead of computing it through the observer plane BE. All sub-holograms Sn together form the CGH of the 3D scene. A processor PM is used to generate point matrices, and to store and modify complex values of the 3D scene.

Figure 2A:
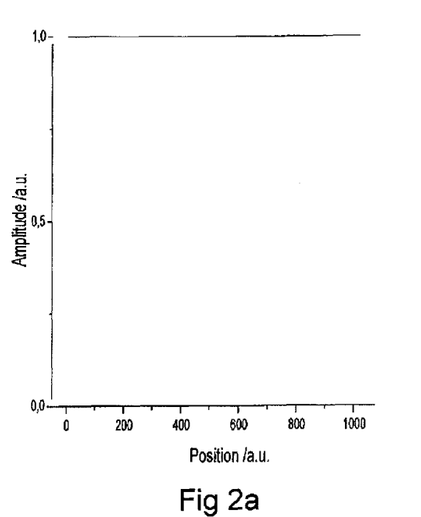
FIG. 2 shows graphic representation of the transform of an individual object point in the visibility region, indicating the absolute value (FIG. 2a) and phase (2b)
Figure 2B:
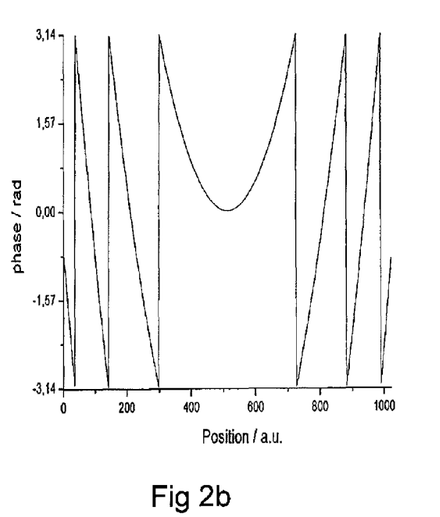

FIGS. 2a and 2b are graphic representations showing the complex-valued light distribution, which is resultant for the object point P in the visibility region SB after transformation from the plane of the object point P into the observer plane BE. The diagram in FIG. 2a shows the absolute value plot of the light distribution, and the diagram in FIG. 2b shows the phase plot.

It can be seen that the absolute value and thus the intensity are constant across the entire width of the visibility region SB. This means that an observer whose one eye pupil is situated at different eye positions An within the visibility region SB can always see the object point P at the same intensity.

The phase plot in the visibility region SB, as shown in FIG. 2b, represents a diverging wave front, i.e. a spherical wave, which originates in the object point P and propagates towards the observer plane BE.

Generally, it can be said that if the CGH of the 3D scene is computed involving the steps of a Fresnel transformation from each plane of the individual object points Pn of the 3D scene into the observer plane BE only, one will get a 3D scene with bright and dark object points. But the relative brightness, at which an observer sees the individual object points of the 3D scene, is the same on average for all eye positions within the visibility region SB. This partly conflicts with a realistic representation of a 3D scene for example if certain object points of the reconstructed 3D scene can be seen brighter from one eye position and darker from another eye position.

Figure 3:
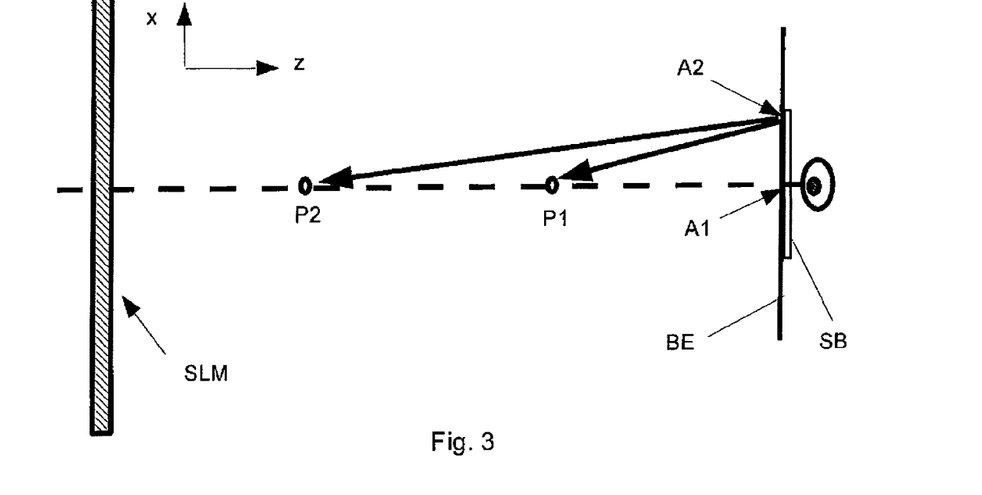
FIG. 3 is a top view illustrating the visibility of two reconstructed object points from two different eye positions.

FIG. 3 shows an example with two object points P1; P2 of the 3D scene which are situated at different distances to the visibility region SB in the reconstruction volume RV.

If the reconstruction volume RV is based on a x, y, z coordinate system with the depth coordinate z and the lateral coordinates x and y, the object points P1; P2 here differ in their distance z to the visibility region SB or to the eye positions A1; A2, while they have the same x and y coordinates.

If during observation of the 3D scene the eye of the observer is situated directly in the centre of the visibility region SB, at the eye position A1, the eye would only see the closer object point P1 of the real 3D scene. The object point P2 is hidden behind the object point P1.

However, if the eye is situated at an eye position A2, the observer would see both object points P1; P2.

The measure for this is the angle at which the eye looks at the two object points P1; P2. In FIG. 3, this is the angle embraced by the two arrows which start in the eye position A2 and run towards P1 and P2. If this angle is larger than the typical resolution of the eye in the range of one arc minute, P1 and P2 are perceived to be separate.

The aim of using a visibility function is to consider these properties regarding the visibility of real object points during the hologram computation.

Figure 4:
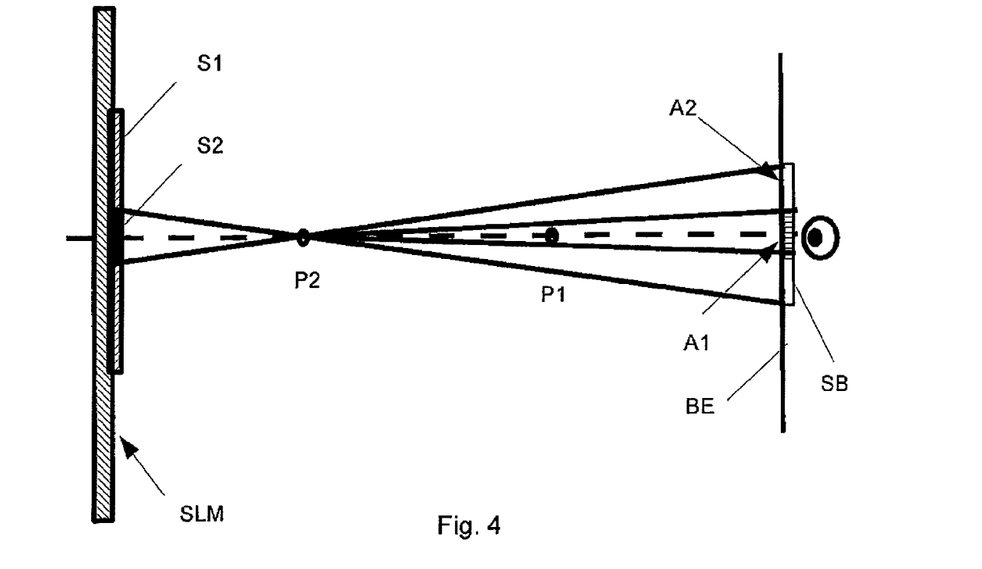
FIG. 4 is a top view showing two object points with corresponding sub-holograms and illustrating the visibility of the object points from two different eye positions.

FIG. 4 shows in the hologram plane the sub-holograms S1; S2 of the two object points P1; P2. They are spatially overlapped. Because the object point P2 is situated closer to the hologram plane, the sub-hologram S2 is smaller than the sub-hologram 51. The visibility region SB exhibits a sub-region, which is hatched in the Figure, in which it is not possible to see the real object point P2 from the eye position A1 of the observer eye. This sub-region is covered by the object point P1. The size of that sub-region is determined by the extent of the Airy disk as which the object point P1 is seen in the reconstruction by the observer. Only if the observer eye is situated at a different eye position, e.g. at A2, in the visibility region SB but outside the hatched sub-region, can it see the object point P2.

Figure 5A:
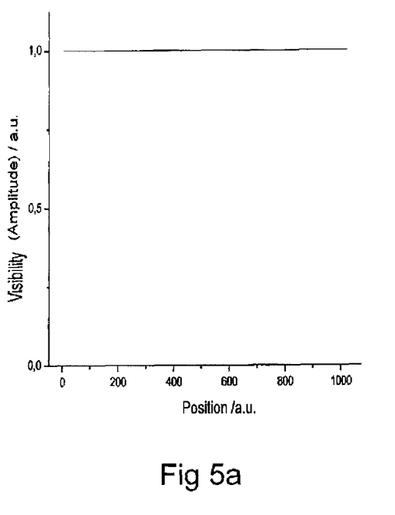
FIG. 5 shows the plot of the visibility function for the object points of FIG. 4.
Figure 5B:
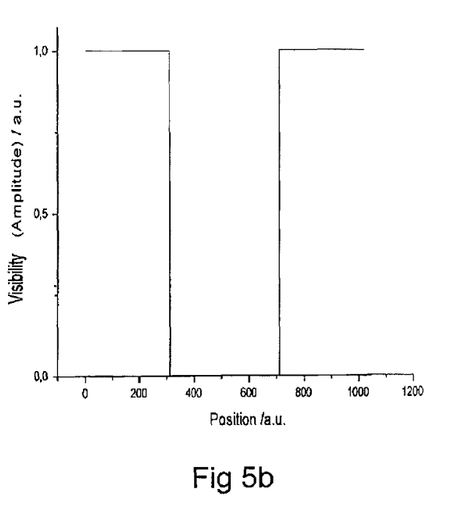

FIGS. 5a and 5b illustrate the use of visibility functions for the reconstruction of the two object points P1; P2, corresponding to the real scene, from the previous Figures. The visibility function can have values ranging between 0 and 1. Related to the object point P1, it always has the constant value 1, and the object point P1 can be seen at the same brightness from any eye positions An in the visibility region SB. In contrast, the visibility function of the object point P2 has the value 0 in the hatched sub-region, which lies in the centre of the visibility region, because the object point P2 is invisible in that sub-region. Outside of that central sub-region it has the value 1, because the object point P2 is visible from there. The horizontal axis of the visibility function is shown with arbitrary units in the diagrams. The part of the horizontal axis shown corresponds with the width of the visibility region.

Figure 6:
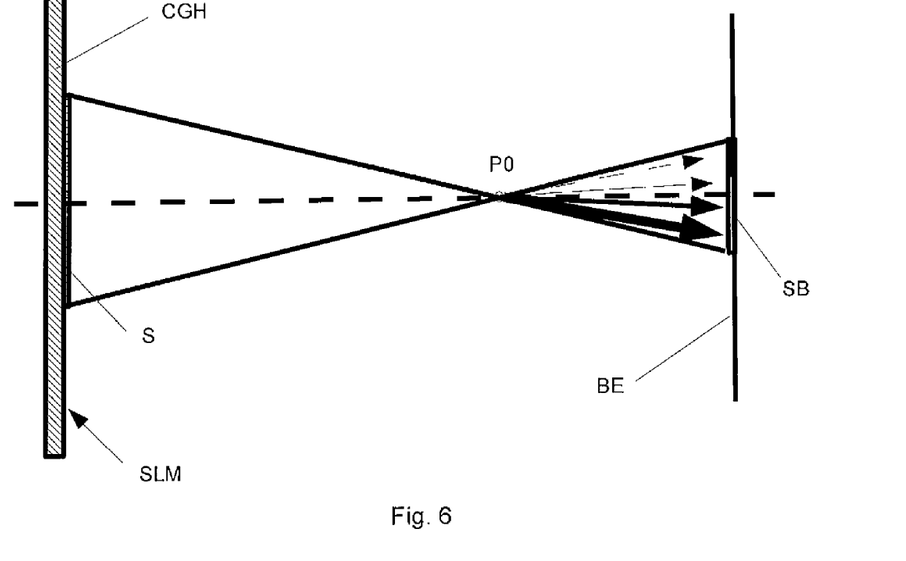
FIG. 6 shows a reconstructed object point with directed light radiation.
Figure 7:
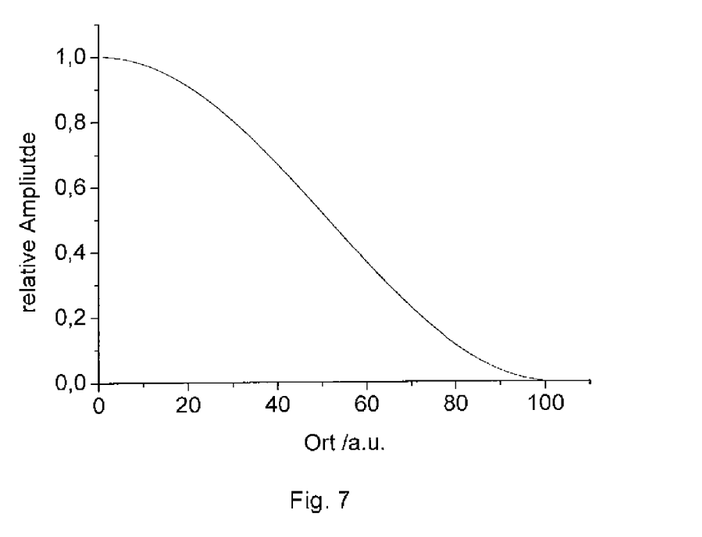
FIG. 7 is a graphic representation of the visibility function for the object point of FIG. 6.

FIG. 6 shows an object point P with the encoded sub-hologram S and a directed light radiation, where a large number of those object points form a 3D scene. These object points can represent a surface with a defined structure, e.g. a shiny surface, onto which the light of a light source falls e.g. in a directed manner. It is defined by the structure of the 3D scene that more light shall propagate from the object point P to the lower region of the visibility region SB than to the upper region. This is illustrated in the drawing by arrows which differ in thickness pointing towards the visibility region SB, where the thickest arrow represents the greatest visibility in FIG. 7. FIG. 7 shows the plot of a visibility function for the object point P, with which such a directed light radiation from the object point P is achieved in the reconstruction. The left margin in FIG. 7 corresponds to the lower edge of the visibility region SB in FIG. 6.

An extreme case for a directed radiation characteristic of an object point Pn is a reflecting surface of a 3D scene which is illuminated by a light source, e.g. by a weak laser beam. It was only possible to see the induced reflection from certain eye positions An in the visibility region SB.

The visibility function for an individual object point can be determined e.g. based on geometrical relations considering the positions of other object points of the 3D scene and be stored in a processor means.

The sub-hologram of an object point whose brightness in the visibility region changes for example continuously can preferably also be computed by way of multiplication with a continuously changing visibility function.

To be able to implement the method, processor means PM of the 3D scene create a spatial point matrix. The horizontal and vertical positions and the depth positions in the reconstruction volume RV can thus be defined for a large number of object points Pn. The object points Pn are then assigned in the processor PM with intensity and phase values which are predetermined and stored, such that the object points Pn approximate the 3D scene at high quality.

In a further process step, the complex-valued wave front of each object point Pn in the observer plane BE is computed in order to compute the CGH of the 3D scene. The absolute value or intensity of the complex-valued wave front of each object point Pn is then multiplied with an accordingly assigned visibility function. This assignment is based on the point matrix and is stored in the processor PM. Thereafter, the thus modified wave fronts of all object points Pn of the 3D scene are added so as to form an aggregated modified wave front.

The modified wave front is then transformed into the hologram plane. This transformation automatically also modifies the sub-holograms Sn of all individual object points Pn with their visibility function.

The complex values which were computed in the transformation produce the modified control values which are generated by a control means, not shown, as control signals for encoding. The CGH encoded with the control values is transformed into the visibility region in the observer plane BE for reconstructing the 3D scene. An observer eye can see from any eye position An in the visibility region SB the realistic reconstruction of the 3D scene in the reconstruction volume RV. Here, 'realistic' shall be understood to refer to the visibility or invisibility of object parts, represented by object points, which is adapted to the respective eye position in the visibility region.

According to a slightly varied embodiment of the method, where sub-holograms Sn are computed directly in the hologram plane, the modification can be achieved by multiplying the sub-holograms Sn with the respective transform of the visibility function of the individual object point.

Instead of the mathematically exact convolution of the sub-hologram with the transform of the visibility function, the convolution can be approximated by a multiplication with a visibility function which is resized to match the width of the sub-hologram, as was already mentioned above.

Figure 8A:
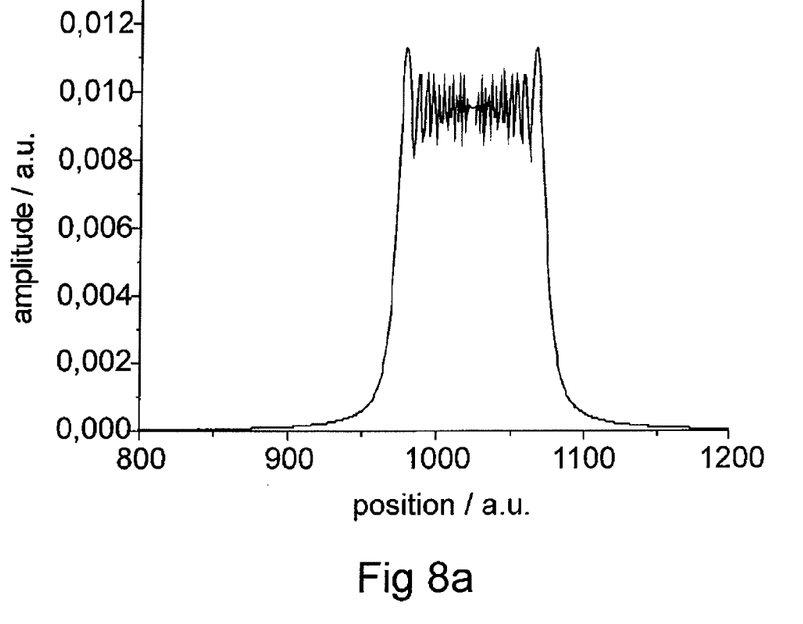
FIG. 8a shows an amplitude of a sub-hologram without application of the visibility function.
Figure 8B:
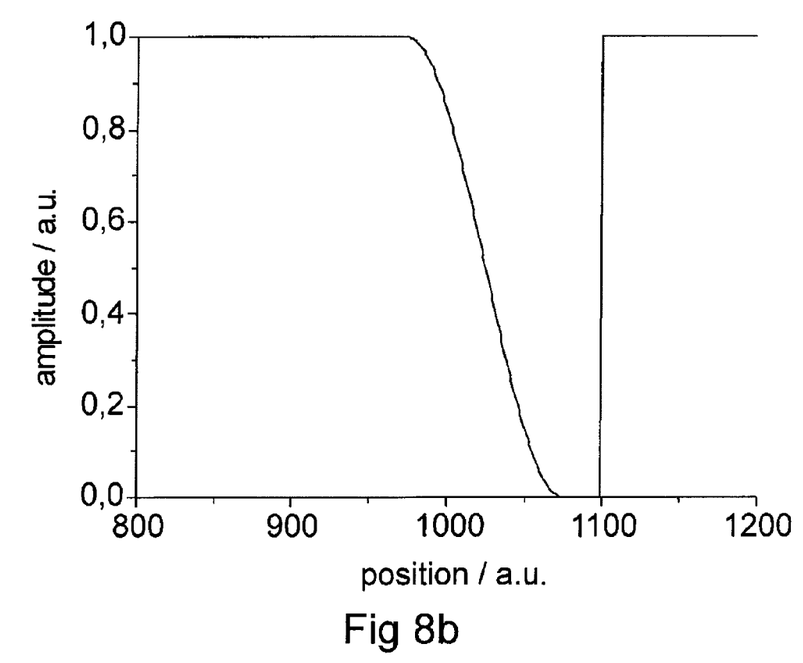
FIG. 8b shows a visibility function, similar to FIG. 7, resized to match the width of a sub-hologram.
Figure 8C:
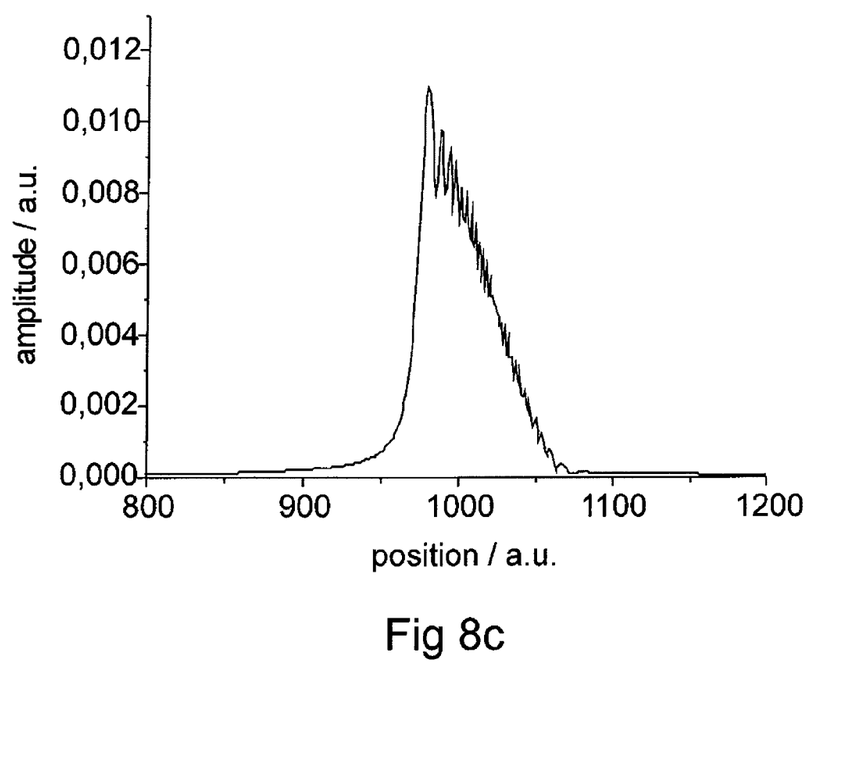
FIG. 8c shows a resultant amplitude of the sub-hologram in FIG. 8b after multiplication with the visibility function.

This is illustrated in FIGS. 8a to 8c. These Figures show graphic representations which result from the multiplication of the visibility function in the sub-hologram, not in the visibility region.

FIG. 8a shows exemplarily the amplitude of a sub-hologram of an object point, where no particular visibility function was applied. This amplitude is similar to a square function, when neglecting minor oscillations and a steadily falling graph. It can be approximated by a square function.

FIG. 8b shows the same visibility function as shown in FIG. 7, but here it is resized to match the width of the sub-hologram of FIG. 8a, and continues with the constant value of 1 outside the sub-hologram.

FIG. 8c shows the result of the multiplication of the functions shown in FIGS. 8a and 8b in the form of a sub-hologram with an amplitude which decreases towards one side.

As the size of a sub-hologram depends on the distance from the object point to the screen, each sub-hologram must be multiplied with a visibility function which is individually resized to its particular width. This would correspond with a compression or dilation of the graph shown in FIG. 8b according to the depth coordinate of the object point.

The method described can be implemented in a holographic display device which comprises the processor means, computing means, transformation means and control means necessary to implement the method, as set forth in claims 5 to 10.

The method has the advantage that by way of modifying object points of the 3D scene with a visibility function, the different visibility of object points from different viewing angles is taken into account during hologram computation. Object points which are seen at different brightnesses from individual eye positions are represented accordingly in the reconstruction.

The invention claimed is:

1. Method for reconstructing a three-dimensional (3D) scene, comprising:

encoding the 3D scene, which comprises individual object points, in the form of a computer-generated hologram (CGH) on a light modulator of a holographic display device, illuminating, with at least one light source, the light modulator with coherent light and transforming the light with at least one transformation lens, and controlling, with a processor, control signals for encoding and reconstructing, wherein the reconstruction of the 3D scene is visible from an observer plane within a visibility region, the processor generates a spatial point matrix for defining a position of individual object points in horizontal, vertical and depth directions in a reconstruction volume, and assigns the object points with predetermined intensity and phase values which approximate the 3D scene, a complex-valued wave front is computed for each individual object point within the visibility region, and the intensity values of the object points are multiplied with a visibility function which is assigned to the individual object points, in order to obtain modified wave fronts of the individual object points, which are added so as to form an aggregated modified wave front of the object points, the modified wave front is transformed by a transformation means into a plane of the light modulator in order to compute modified control values for the object points, and control signals are generated in a control means, in order to encode the CGH in the light modulator with the modified control values and to transform it into the visibility region so as to reconstruct the 3D scene.

2. Method according to claim 1, where the 3D scene is sliced into section layers which are parallel to the plane of a light modulator, and where a two-dimensional point matrix is generated in each section layer for defining the position of individual object points in the respective section layer.

3. Method according to claim 2, where the visibility function is varied depending on intensity variations of the object points of the 3D scene in adjacent section layers.

4. Method according to claim 2 where the visibility function is continuously varied depending on continuous intensity variations of the object points of the 3D scene in adjacent section layers.

5. Method according to claim 1 where a computing means computes a sub-hologram for each object point of the 3D scene which is assigned with a certain intensity and phase value according to the point matrix directly on the light modulator, and where the visibility functions in the visibility region which are assigned to the object points are transformed by a transformation means into the plane of the light modulator and convolved with the sub-holograms in order to encode a modified CGH, which is transformed into the visibility region in order to reconstruct the 3D scene.

6. Holographic display device, where a 3D scene, which comprises individual object points, is encoded in the form of a computer-generated hologram (CGH) on a light modulator of a holographic display device, where a processor controls control signals for encoding and reconstructing, and where the reconstruction of the 3D scene can be viewed from a visibility region, comprising processor means for generating a spatial point matrix, in order
to define a position of individual object points in horizontal, vertical and depth directions, and
to assign the object points with predetermined intensity and phase values for approximating the 3D scene, computing means for computing a complex-valued wave front for each individual object point within the visibility region, for multiplying the intensity values of the object points with an assigned visibility function, for adding the modified wave fronts of the individual object points in order to form an aggregated modified wave front of all object points, and for generating the visibility function for the object points, transformation means for transforming the modified wave front into a plane of the light modulator, in order to compute modified control values for the object points, and control means for generating control signals in the processor, in order to encode the CGH on the light modulator with the modified control values and to transform it into the visibility region so as to reconstruct the 3D scene.

7. Holographic display device according to claim 6 where the 3D scene is sliced into section layers which are parallel to the plane of a light modulator and where a two-dimensional point matrix is generated in each section layer for defining the position of individual object points.

8. Holographic display device according to claim 7 where the object points of a section layer lie in a point matrix which is characterised by a uniform spacing both in the horizontal and vertical directions.

9. Holographic display device according to claim 7 where the object points of a section layer lie in a point matrix which is characterised by a different spacing.

10. Holographic display device according to claim 7 where the spacing differs among adjacent section layers.

11. Holographic display device according to claim 6 where each object point is encoded as a sub-hologram on the light modulator.

* * * * *